United States Patent
Besinger

(10) Patent No.: US 8,193,073 B2
(45) Date of Patent: Jun. 5, 2012

(54) METHOD FOR SEPARATING PARTS FROM A SUBSTRATE

(75) Inventor: Jörn Besinger, Landshut (DE)

(73) Assignee: Schott AG, Mainz (DE)

( * ) Notice: Subject to any disclaimer, the term of this patent is extended or adjusted under 35 U.S.C. 154(b) by 1124 days.

(21) Appl. No.: 11/534,863

(22) Filed: Sep. 25, 2006

(65) Prior Publication Data

US 2007/0105347 A1    May 10, 2007

(30) Foreign Application Priority Data

Sep. 26, 2005  (DE) .......................... 10 2005 046 031

(51) Int. Cl.
*H01L 21/00* (2006.01)

(52) U.S. Cl. ....................................... 438/463; 438/464

(58) Field of Classification Search .................. 313/244; 438/113, 461–465
See application file for complete search history.

(56) References Cited

U.S. PATENT DOCUMENTS

| | | |
|---|---|---|
| 5,618,759 A | 4/1997 | Boysel |
| 5,953,590 A | 9/1999 | Piper et al. |
| 6,386,191 B1 | 5/2002 | Yoshimura et al. |
| 6,612,910 B1 | 9/2003 | Hirano et al. |
| 6,648,644 B1 * | 11/2003 | Flemmig et al. ............ 433/216 |
| 6,746,022 B2 | 6/2004 | Cheung et al. |
| 2004/0020960 A1 * | 2/2004 | Hauer et al. ................... 225/2 |

FOREIGN PATENT DOCUMENTS

| | | |
|---|---|---|
| DE | 100 60 696 | 6/2002 |
| DE | 100 60 696 A1 | 6/2002 |
| DE | 103 37 920 | 3/2005 |
| DE | 103 37 920 A1 | 3/2005 |
| EP | 1 422 201 | 5/2004 |
| EP | 1 422 201 A2 | 5/2004 |
| JP | H06-008145 A | 1/1994 |
| JP | 2003051466 A | 2/2003 |
| WO | 2004066369 A2 | 8/2004 |

OTHER PUBLICATIONS

"Chinese Office Action for Chinese International Application No. 200610063907.8", Nov. 25, 2010, Publisher: Chinese Patent Office, Published in: CN.
Numaoi, Yasunobu, "JP Application No. 2006-260495 Office Action Oct. 7, 2011"Publisher: JPO, Published in: JP.

* cited by examiner

*Primary Examiner* — Karabi Guharay
*Assistant Examiner* — Elmito Breval
(74) *Attorney, Agent, or Firm* — DeMont & Breyer, LLC

(57) ABSTRACT

An improved method for producing a plurality of parts (30) from a plate-type substrate (20) is disclosed, comprising the steps of: (a) laterally separating the parts (30) from a plate-type substrate (20) fixed on a first vacuum plate (3); (b) sucking the parts (30) on a first vacuum plate (3); and (c) detaching the separated parts (30) from the first vacuum plate (3).

23 Claims, 6 Drawing Sheets

Figure 1:
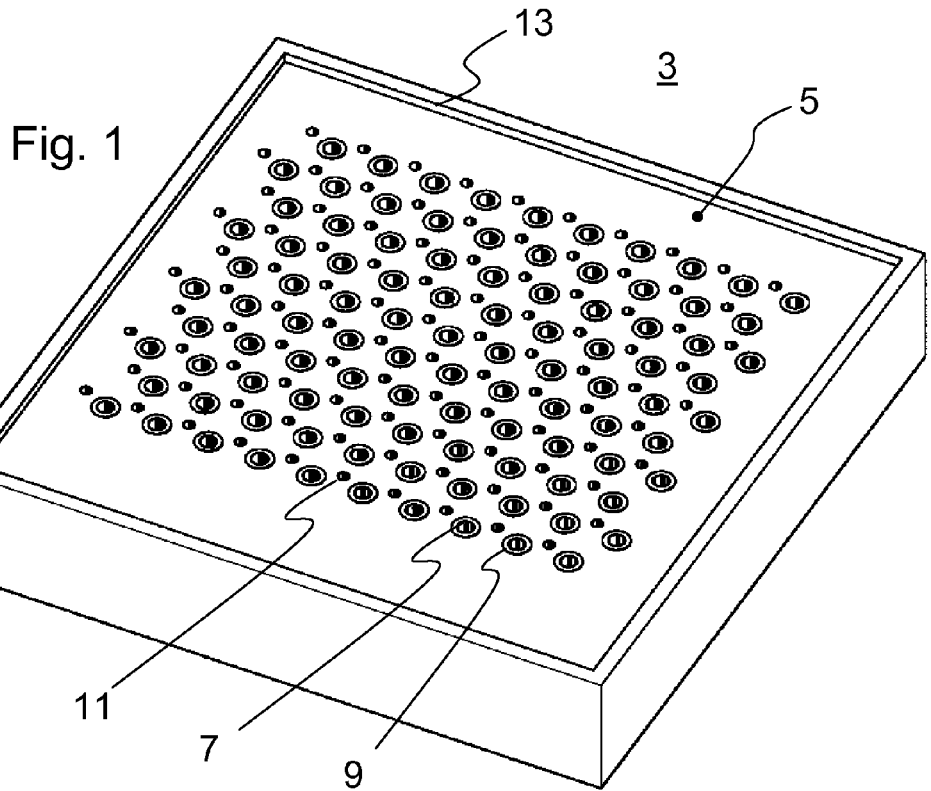

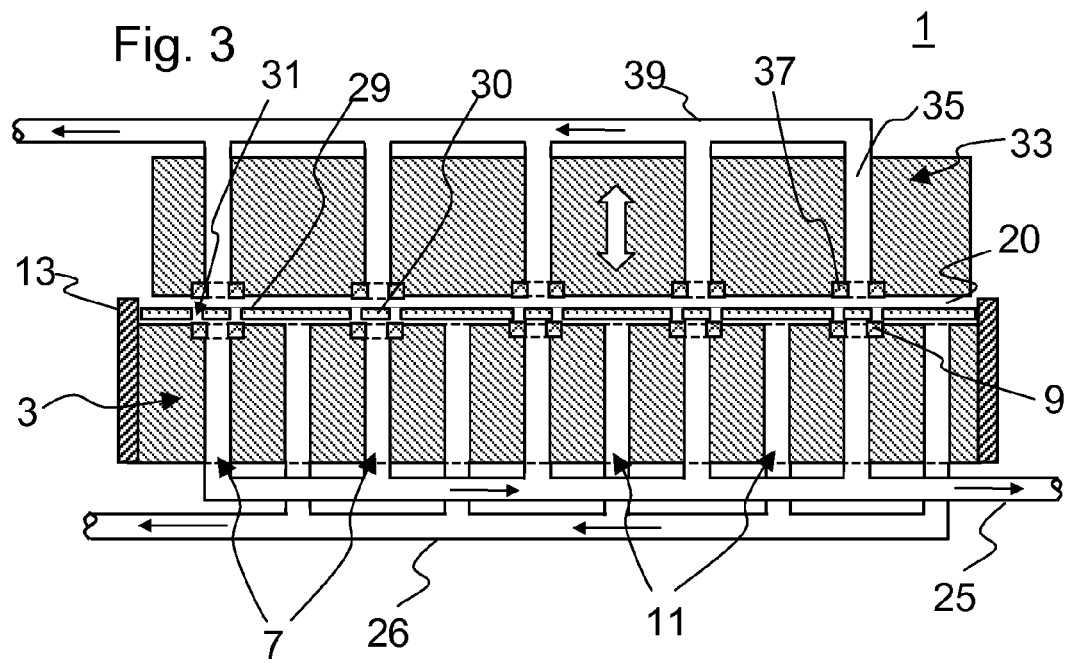
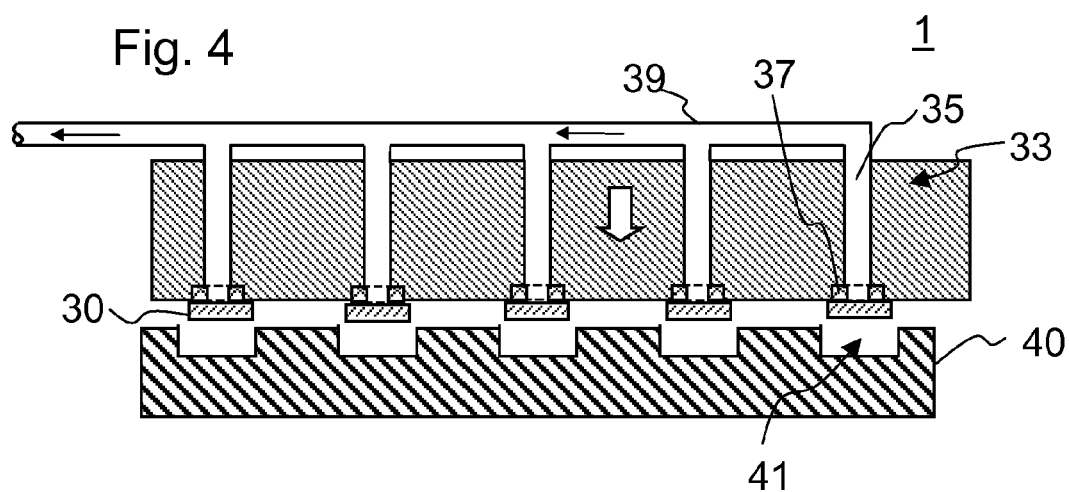

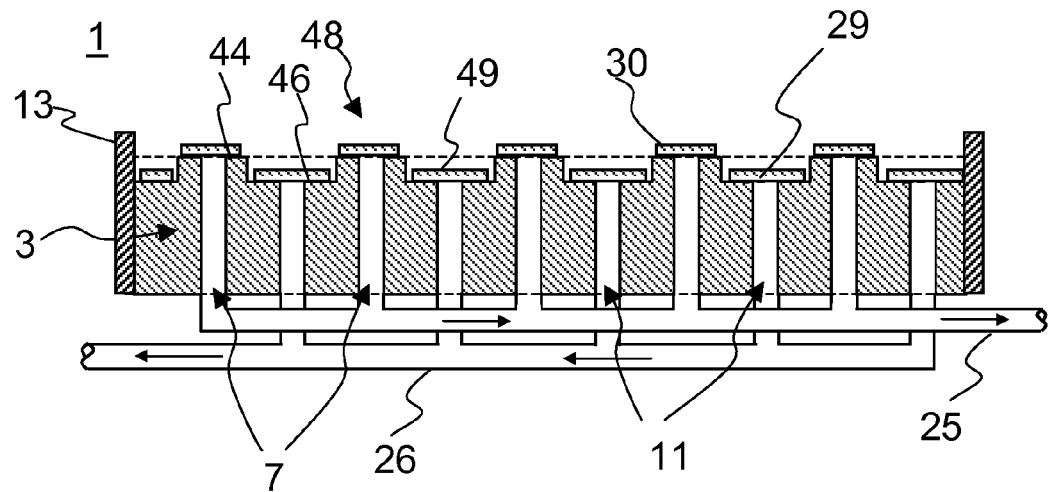
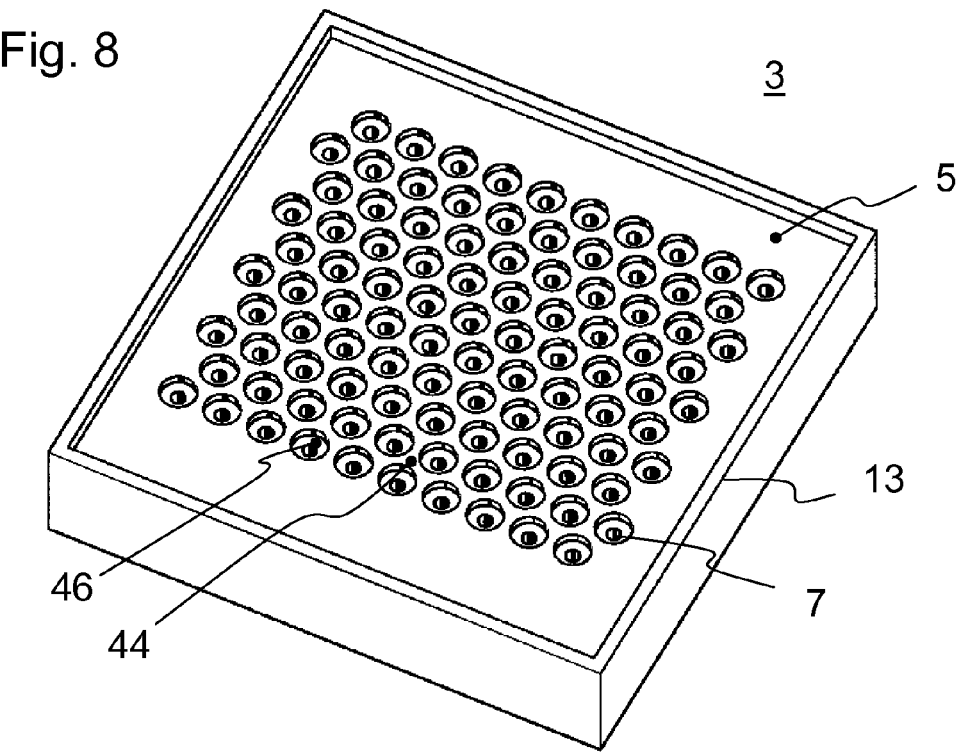

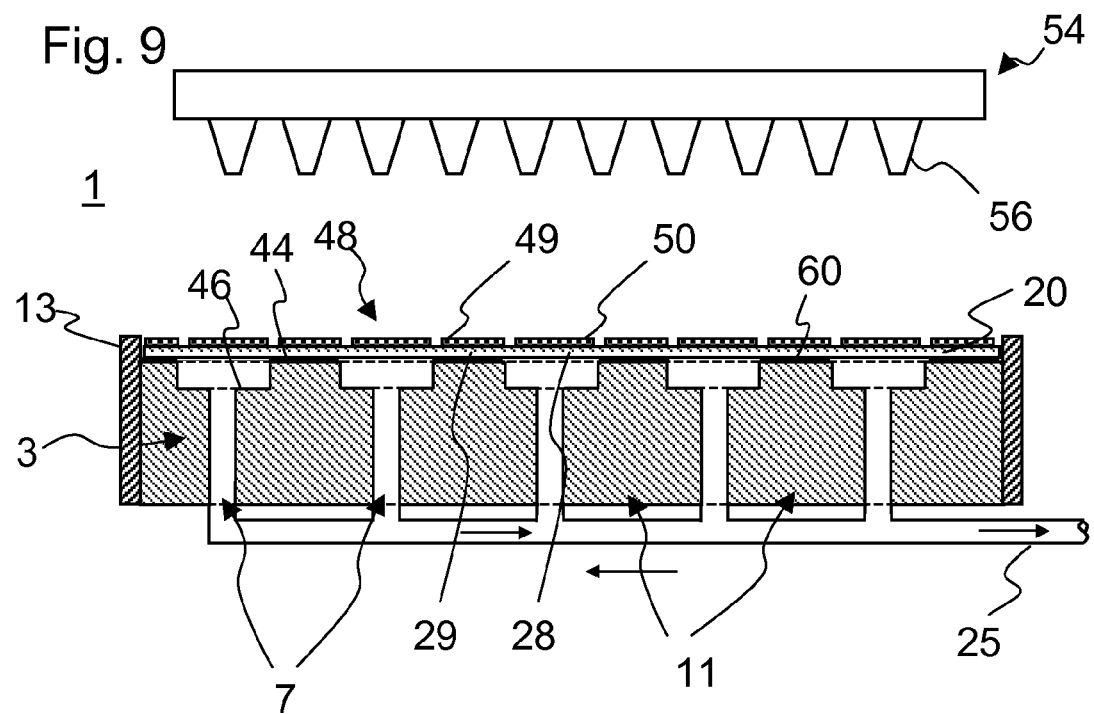
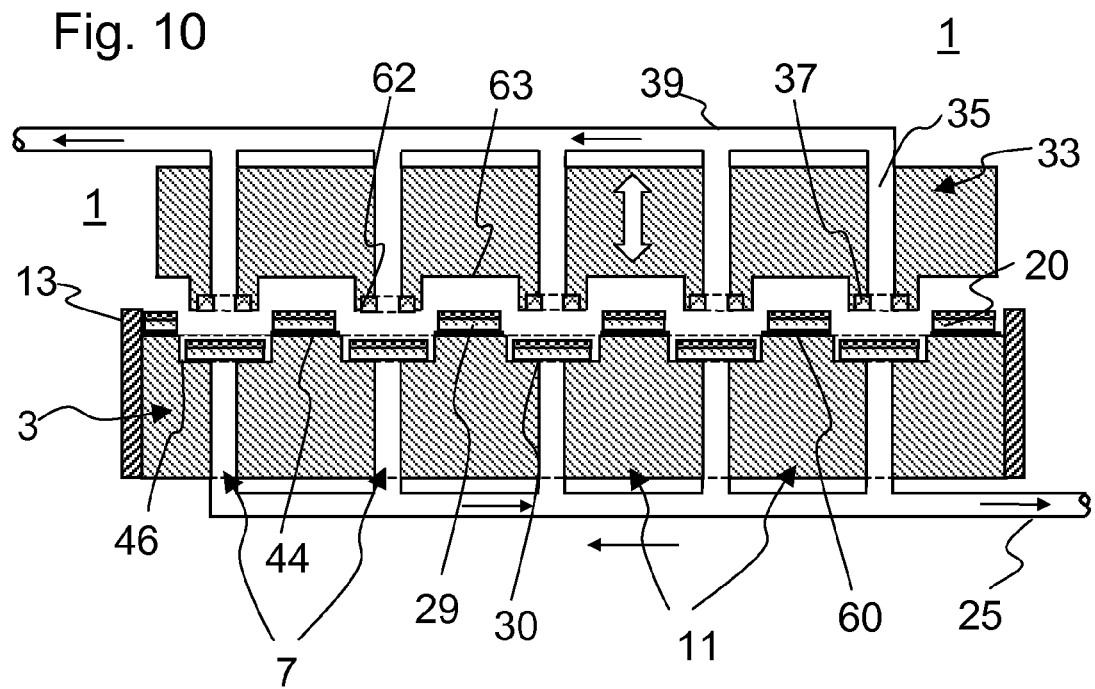

METHOD FOR SEPARATING PARTS FROM A SUBSTRATE

The invention relates generally to the separation of parts from a substrate, in particular to the separation of components from substrates comprising hard or brittle materials by a process of working from the substrate.

Glass is suitable as contact or covering material in many areas of application. However, glass is difficult to process, which has a disadvantageous effect particularly if very small components, such as, for example, glass windows for optocaps, that is to say caps of optoelectronic components, are to be produced.

Conventional glass processing techniques, such as scribing and breaking, are difficult to use for such applications on account of the component size. Furthermore, the aforementioned techniques generally require subsequent edge processing, which possibly has to be carried out individually. This is associated with considerable costs.

In order nevertheless to keep the costs within acceptable limits, work is often also performed using a stacked assembly for this purpose. In this case, a plurality of optical components are connected to form a stack and drilled. The edges are then processed disadvantageously in a separate work step. In order to hold the components together in the stack, they are usually connected using wax or other adhesive substances. Although the stacking on the one hand reduces costs, the use of the connecting materials gives rise to contamination which has to be removed again by complex cleaning processes. This drives up the costs again.

In practice, yet another difficulty is manifested, which not only makes the method cost-intensive, but also considerably impairs the quality of the products. This difficulty is that during the cleaning of the glasses so as to remove the adhesive substances, relative movements occur between the glasses, which often leads to scratches in the surface. This is especially disadvantageous if glasses with a high quality and expensive coating are being processed. One such example which may be mentioned is a complex inter-reflection coating having a plurality of extremely thin layers of various types. On account of their mechanical properties, layers of this type are particularly susceptible to scratches, under certain circumstances. With the conventional methods, therefore, there is an inter-relation between contradictory requirements made of economic viability and cost efficiency.

DE 103 37 920 A1 proposes meeting these requirements by applying an individual glass substrate on a carrier film and then laterally separating components from one another by means of a material-removing method, said components initially remaining connected to the film. However, the components subsequently have to be separated from the film, in which case adhesive residues may once again remain on the components.

In chipmaking, too, the individual chips are fabricated on a wafer and subsequently separated. Here the separation is usually effected by sawing.

In this respect, U.S. Pat. No. 4,138,304 discloses a method for dividing a wafer into parts, in which the wafer is fixed on a membrane and then sawn. This involves using an adhesive which adheres more tenaciously to the membrane than to the wafer material in order to enable residue-free removal. However, in this case the adhesive bond has to be resolved by stripping away from the adhesive bond that still exists. This is disadvantageous on account of the considerable force action required for this purpose.

JP 06008145 A also discloses a method in which individual parts are separated from a flat glass substrate, the substrate being adhesively bonded on a support for processing by means of double-sided adhesive tape. In this case, too, the adhesion force must first be overcome in order to obtain and be able to process further the substrate or separated parts.

DE 100 16 628 A1 discloses a method for producing small thin glass disks which are produced by scribing the thin glass disk by means of a laser beam and subsequently singulating it by mechanical breaking. In this case provision is furthermore made for applying the printed and scribed thin glass disk onto a plastic carrier film in order to initiate the breaking apart along the courses of cracks by means of tensile forces. It is furthermore proposed to divide the thin glass plate by means of separating grinding along the separating lines provided for this purpose.

In all these methods known from the prior art, the problem arises that the separated parts are difficult to separate from the support. When using adhesives or similar adhesion agents, the problem additionally arises that the surfaces of the parts may be contaminated and the components may be damaged during subsequent cleaning.

Accordingly, the invention is based on the object of avoiding or at least alleviating these disadvantages from the prior art, and in particular also of improving the handling of the separated parts and/or of the substrate after the separating operation. This object is already achieved in an extremely surprisingly simple manner by means of the subject matter of the independent claims. Advantageous refinements and developments are specified in the dependent claims.

Accordingly, the invention provides a method for producing a plurality of parts, comprising the steps of: laterally separating the parts from a plate-type substrate fixed on a first vacuum plate, sucking the parts on a first vacuum plate, and detaching the separated parts from the first vacuum plate. The corresponding apparatus for producing a plurality of parts from a plate-type substrate, in particular for carrying out the method according to the invention, comprises in this respect a first vacuum plate for fixing the plate-type substrate, a device for laterally separating the parts from the substrate, and a device for detaching the separated parts from the first vacuum plate.

In accordance with a first embodiment of the invention, the method comprises the steps of: sucking the plate-type substrate on a first vacuum plate, laterally separating the parts, the parts remaining sucked on the first vacuum plate during separation, and detaching the parts from the first vacuum plate.

In accordance with a further embodiment of the invention, the method comprises the steps of: fixing the plate-type substrate on a first vacuum plate, laterally separating the parts, sucking the separated parts through the first vacuum plate, and detaching the parts from the first vacuum plate. In this case, the substrate need not necessarily be fixed on the vacuum plate by being sucked thereon; it is even possible in this case for the substrate also to be fixed in a different way, such as adhesively, for instance. However, in this embodiment of the invention, too, the separated parts are then held and fixed on the plate by means of an applied vacuum. In particular, this is preferably effected exclusively by vacuum without the use of other holding means, such as adhesion agents for instance.

According to the invention, in both cases the components are laterally separated from one another from a plate-type substrate. Lateral separation is understood to mean separation along a separating line running laterally, that is to say along a side area of the substrate. Accordingly, smaller plate-type or laminar parts are separated from a plate-type substrate. In this case, typical dimensions of the laminar parts are preferably 1.5 to 10 millimeters given a diameter or an edge length of 1 to 20 millimeters. Preferred substrate thicknesses lie within the range of 0.03 to 2 millimeters, particularly preferably within the range of 0.15 to 1.5 millimeters.

It is surprising that fixing by sucking onto a vacuum plate is sufficient to prevent the parts from being detached while they are being worked. In the case of fixing by adhesive bonding as known from the prior art, the force per unit area essentially does not change even after lateral separation of the parts. By contrast, on a vacuum plate, air can penetrate at the edges of the worked parts. One would therefore actually expect a decrease in the contact pressure when severing the substrate by means of the separating tool or tools, and an increase in the risk of a detachment or at least a displacement of the parts on the vacuum plate. It is nevertheless found that they can be held sufficiently fixedly and securely against displacement even while they are being worked, even after lateral separation.

Particularly if the parts to be produced do not have a contour with which an area filling can be obtained from a multiplicity of such parts placed against one another, the separation of the individual parts is in each case preferably performed along a peripheral separating line. In this way, it is advantageously possible for not only rectangular or square parts but also round or oval parts to be worked from the substrate.

The invention can be applied advantageously in particular to the separation of parts from substrates having brittle or hard materials. The invention can thus be used in an outstanding manner for working glass parts, in particular glass laminae from a glass substrate. The invention is likewise also suitable for the processing of quartz glass, ceramic and glass ceramic.

The parts that can be produced by means of the invention, in the form both of round and of rectangular or square laminae, can be used particularly advantageously as windows for optocaps. Accordingly, the invention also provides a method for producing optocaps, in which windows in the optocaps, in particular glass windows, are produced by means of the method according to the invention.

The substrate itself is fixed during processing, that is to say in particular during separation, on the first vacuum plate. The fixing is such that each individual part remains fixed on the vacuum plate in particular during, preferably also after the lateral singulation.

The invention therefore renders the use of adhesion agents, such as adhesives or waxes, dispensable, although the use of adhesion agents nevertheless is not precluded.

In accordance with a particularly preferred embodiment of the invention, detaching the parts from the vacuum plate is effected by lifting off the parts from the first vacuum plate by means of a second vacuum plate. In accordance with one development of the invention, said second vacuum plate may be constructed complementarily with respect to the first vacuum plate. In particular, it is advantageous in this case if the second vacuum plate has vacuum channels arranged complementarily with respect to vacuum channels of the first vacuum plate.

Furthermore, detaching the parts particularly preferably comprises switching off or reducing the suction pressure of the first vacuum plate at least below the laterally separated parts.

The lifted-off parts may be deposited in magazines after lateral separation in order then to subject them to further processing.

Preferably, the worked parts are detached from the first vacuum plate for further processing in groups or in particular altogether. In particular, the parts may be deposited in a washing magazine after separation individually, or preferably jointly in one step. For this purpose, an apparatus according to the invention correspondingly comprises a device for simultaneously depositing a plurality of worked parts in a magazine, in particular a washing magazine.

The lateral separation is preferably effected by means of an abrasive method that is particularly expedient for brittle and/or hard materials.

Suitable abrasive methods include ultrasonic grinding such as, for instance, ultrasonic vibratory lapping and powder jet treatment. Powder jet treatment has the advantage that unlike for example when effecting separation by sawing, parts with optional contours can be worked. It goes without saying that these methods can also be combined for the working process. In order to protect the surface of the parts to be worked, the substrate may be covered with a mask which leaves open regions of the substrate that run along envisaged separating lines and covers regions of the parts to be worked. Such a covering is appropriate particularly when the device for laterally separating the parts from the substrate comprises a powder jet device, or when the separation is effected by powder jet treatment.

In accordance with one development of the invention, the first vacuum plate furthermore has an exchangeable support or carrier plate for the substrate. This is advantageous since even in the case of a protective layer made of plastic, for example, the support surface for the substrate may be attacked in particular by abrasives over the course of time. With advanced wear, the support can then be simply exchanged.

Preferably, in order to reduce the production costs, furthermore a plurality of parts, preferably also all of the parts to be worked, are simultaneously worked from the substrate. In the case of ultrasonic grinding it is possible for example to use a corresponding tool having a plurality of plungers corresponding to the number of parts that are to be separated simultaneously.

The first vacuum plate is particularly preferably designed such that it is not attacked by the separation method. A plastic coating, preferably a Teflon coating, has proved to be expedient particularly for the use of abrasive separation methods.

Furthermore, the vacuum plate may also have plastic rings, in particular also elastic rings, which run along envisaged separating lines of a substrate. Accordingly, the elastic rings, preferably the central chord thereof, follow the outer contour of parts to be separated. The elastic rings absorb the energy of the abrasive medium and thus prevent removal of material from the vacuum plate.

In accordance with one embodiment of the invention, the substrate is sucked on a first vacuum plate having elevated and recessed regions. In this case, the form and arrangement of the regions particularly preferably corresponds to the form of the parts to be worked and the form of the substrate material surrounding said parts.

In accordance with one development of this embodiment, the substrate is sucked on a first vacuum plate having elevated and recessed regions, the elevated regions extending along the parts to be worked and the recessed regions extending along the substrate material surrounding said parts. The substrate parts surrounding the worked parts can then be sucked into the recessed regions of the first vacuum plate. Accordingly, in this variant, the elevated regions are formed for fixing the parts to be worked, and the recessed regions are formed for receiving and fixing the remaining substrate residue(s).

In accordance with another development of the invention, the substrate is likewise sucked on a first vacuum plate having elevated and recessed regions, but the recessed regions extend along the parts to be worked and the elevated regions extend along the substrate material surrounding said parts. The worked parts can then be sucked into the recessed regions of the first vacuum plate after lateral separation. In this variant, the recessed regions of the vacuum plate are correspondingly formed for sucking in the parts separated from the substrate.

This variant has the advantage that it is also possible to use adhesive fixing measures for the substrate which are otherwise inherently undesirable according to the invention owing to the possible contamination. The plate-type substrate can thus be fixed adhesively on the elevated regions without the regions of the parts that are to be separated coming into contact with the adhesion agent.

The terms "elevated" and "recessed" are to be understood in each case relative to one another in the sense of the invention. Thus, the vacuum plate may for example have recesses in an otherwise planar support area. In this case, too, the regions surrounding the recesses are understood as "elevated" regions in the sense of the invention. An area from which elevated structures project is likewise understood as a recessed region, namely the region recessed in relation to the elevated structures.

It is also provided, in accordance with yet another development of the invention, that first regions assigned to the parts to be worked and one or a plurality of second regions of the plate-type substrate surrounding said parts are sucked separately, or in selectively controlled fashion. An apparatus for carrying out this development of the invention accordingly has first regions in particular for fixing the separated parts and at least one second region, these first regions and the at least one second region being separately connected to a vacuum generating device.

In this way, for example after the lateral separation of the parts, it is possible to interrupt the suction for the residual substrate regions and to remove the substrate residues, the worked parts remaining under suction. Conversely, it is also possible first to detach the worked parts, the vacuum being canceled below these parts, while the substrate residues remain under suction. This prevents, for example, residues of the substrate from concomitantly being able to pass into the magazines in which the worked parts are deposited.

In order to ensure a reproducible positioning of the substrate on the first vacuum plate, the plate-type substrate may advantageously be centered in a recess provided therefor in the first vacuum plate.

The plate-type substrate may be a square or rectangular plate, for example. Furthermore, it is also possible to use round plate-type substrates, in particular wafers, too. Moreover, it is not only possible to use the separated parts, rather the perforated plate-type substrate may alternatively or additionally also be used for further processing. By way of example, a wafer having openings can be produced in this way. If such a wafer is connected to a functional wafer, then the openings may be located for example on functional regions of the functional wafer. If an additional covering wafer is applied, the openings may then form, together with the covering wafer, cavities around the functional regions, such as sensor regions, for instance.

Figure 2:
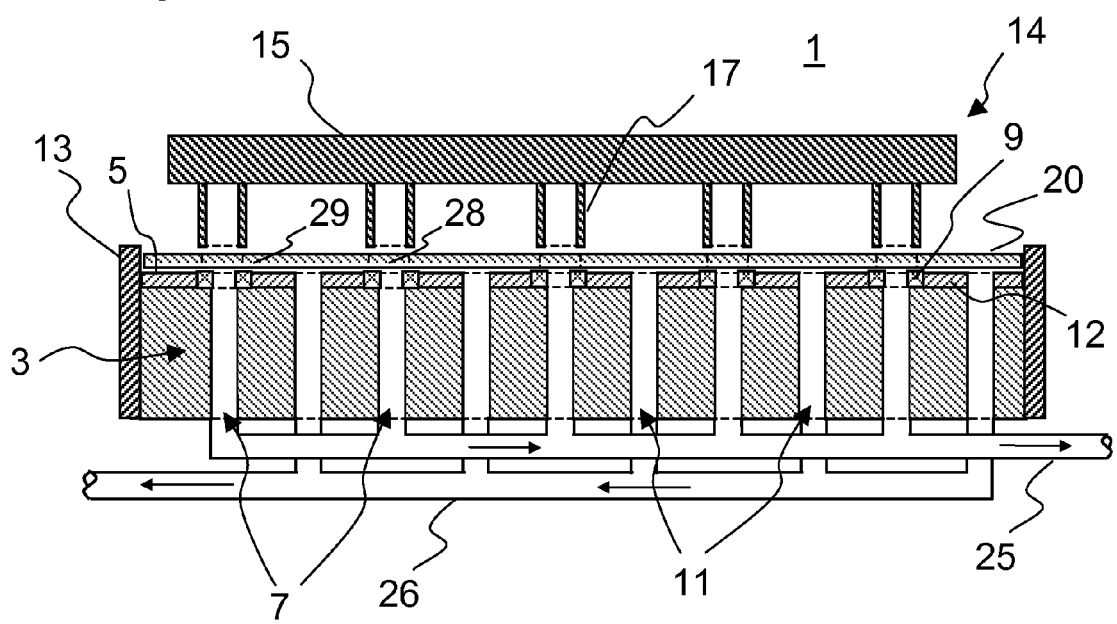
Figure 5:
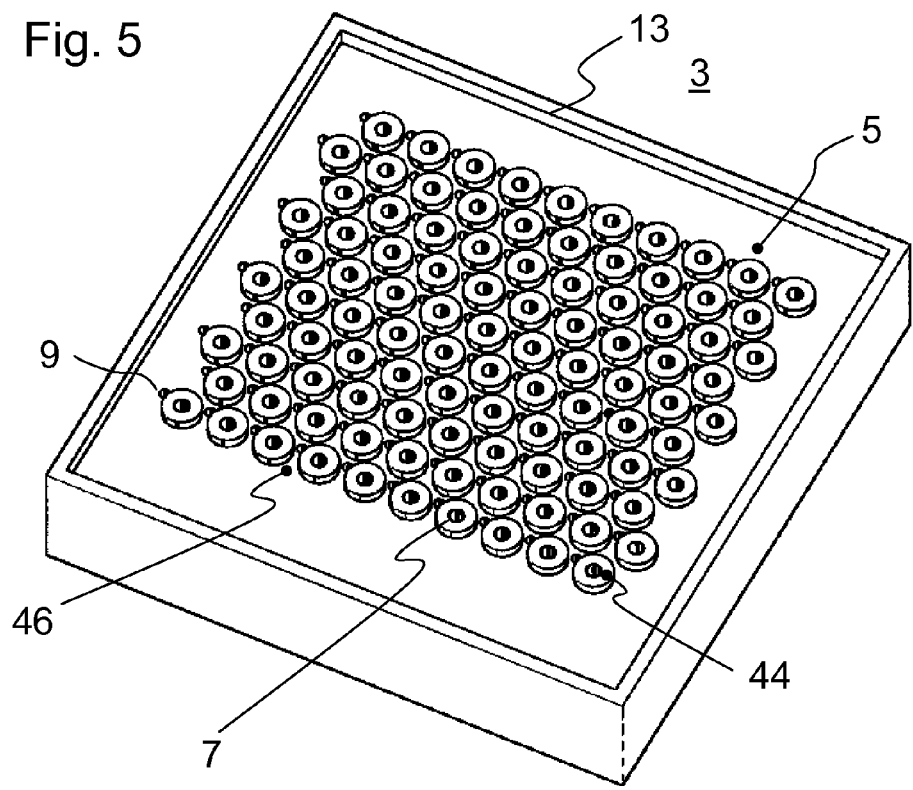
Figure 6:
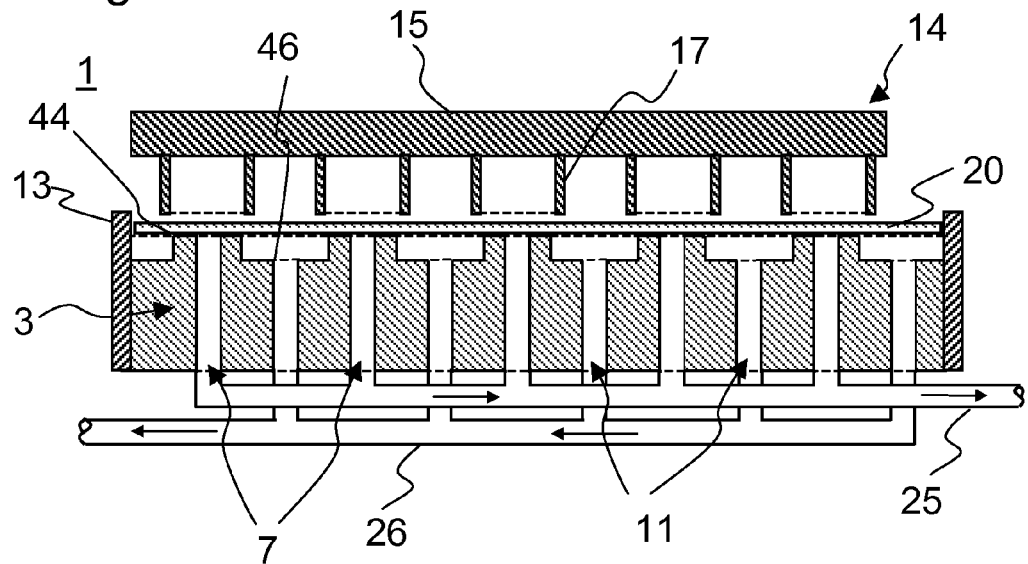
Figure 11:
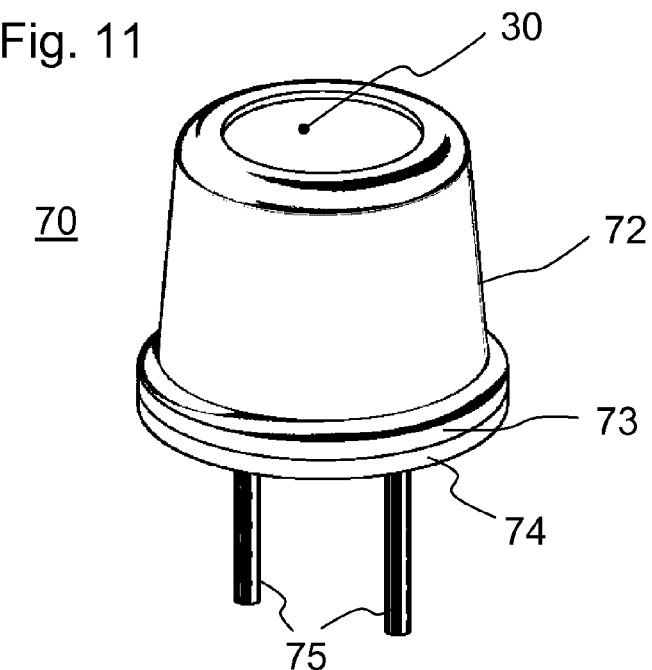
Figure 12:
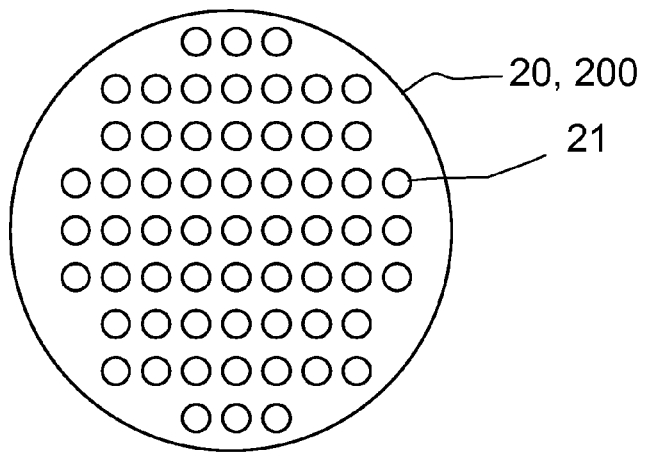
Figure 13:
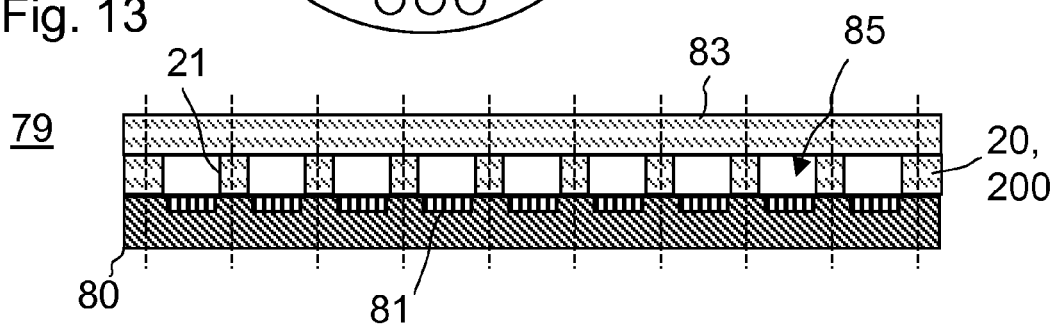

The invention is explained in more detail below on the basis of exemplary embodiments and with reference to the drawings, identical and similar elements being provided with identical reference symbols and the features of different exemplary embodiments being able to be combined with one another. In the figures:

FIG. 1 shows a schematic view of a vacuum plate for fixing a substrate,

FIG. 2 shows a cross-sectional view of an apparatus according to the invention for producing a plurality of parts from a plate-type substrate with a vacuum plate according to FIG. 1, FIG. 3 shows the lift-off of parts separated from a substrate by means of the apparatus shown in FIG. 2, FIG. 4 shows the depositing of the separated parts into a magazine, FIG. 5 shows an exemplary embodiment of a first vacuum plate with elevated and recessed regions, FIG. 6 shows an exemplary embodiment of an apparatus according to the invention with a vacuum plate as illustrated in FIG. 5, FIG. 7 shows the exemplary embodiment shown in FIG. 6 after the lateral separation of parts from a substrate, FIG. 8 shows a further exemplary embodiment of a first vacuum plate with elevated and recessed regions, FIG. 9 shows a cross section through an apparatus 1 according to the invention with a vacuum plate as illustrated in FIG. 8, FIG. 10 shows the lift-off of the parts produced using the apparatus shown in FIG. 9 by means of a second vacuum plate, FIG. 11 shows an optoelectronic component with a part produced according to the invention, FIG. 12 shows a perforated wafer which has been produced by separating parts from the wafer material, and FIG. 13 shows a wafer assembly with the wafer illustrated in FIG. 12.

FIG. 1 shows a schematic view of an exemplary embodiment of a vacuum plate 3 such as may be used for fixing a plate-type substrate during separation of a plurality of parts therefrom in accordance with the invention. The vacuum plate 3 comprises a multiplicity of channels 7 and 11 which open into a support area 5 for the substrate (not illustrated). A first group of channels 7 is surrounded by elastic rings 9. This group of channels serves for fixing the substrate regions to be separated, that is to say the parts to be produced, while the other channels are provided for fixing the substrate regions surrounding said parts.

The vacuum plate 3 shown in FIG. 1 is provided in particular for separating round glass laminae from a thin glass plate.

In this case, the individual glass laminae are each separated along imaginary peripheral separating lines. The latter extend, in particular, along the elastic rings 9. In this way, the energy of the abrasive medium is attenuated after penetration through the substrate and the vacuum plate is not damaged.

As a further protective measure, the support area 5 may additionally be plastic-coated, preferably Teflon-coated, in order to prevent the parts to be worked from being scratched.

The vacuum plate 3 additionally comprises a frame 13 projecting above the support area 5, with the result that a recess is formed. The substrate is introduced into the recess for processing and is laterally positioned and centered in this way. The frame 13 may be configured both such that it is fixed and such that it is collapsible for the centering of the substrate 20.

FIG. 2 shows a cross-sectional view of an apparatus according to the invention for producing a plurality of parts from a plate-type substrate 20. In this case, the apparatus comprises a first vacuum plate 3 as illustrated in FIG. 1.

The lateral separation of parts from the substrate 20 is carried out by means of ultrasonic grinding, in particular by ultrasonic vibratory lapping, in the example shown in FIG. 2. The substrate 20 is made of brittle or hard material, such as, for instance, quartz glass, ceramic or glass ceramic, particularly preferably from glass, which can be used outstandingly according to the invention in order to work therefrom parts in the form of small glass laminae such as are used for instance as windows for the production of optocaps.

An ultrasonic grinding device having a sonotrode 15 and a plurality of lapping plungers 17 fixed thereto is provided for this purpose. The lapping plungers 17 have a circular grinding face for the separation of round glass laminae along a peripheral separating line. The lapping plungers process the substrate 20 simultaneously, with the result that a plurality of parts are corresponding also worked simultaneously from the substrate. In this exemplary embodiment, the plate-type substrate 3 is sucked on the first vacuum plate 3 and the parts are separated laterally, the parts remaining under suction and thereby fixed on the first vacuum plate 3 during separation and also afterward.

The vacuum plate 3 furthermore has an exchangeable support 12 for the substrate 20. If the support area 5 is worn by the lapping plungers 15, then the support 12 can be exchanged without having to exchange the entire vacuum plate 3. The support 12 preferably comprises materials which can absorb the energy of the abrasive medium, preferably rubber, Teflon or similar plastics.

In the example shown in FIG. 2, the first vacuum plate 3 additionally has first regions for fixing the parts to be separated from the substrate 20, and at least one second region, the first regions and the at least one second region being separately connected to a vacuum generating device. First regions 28 assigned to the parts to be worked and second regions or parts 29 of the plate-type substrate surrounding said parts can thus be sucked in selectively driven fashion. Specifically, the channels 7 for suction of the parts to be separated are connected to a first vacuum line system 25 and the channels 11 which open into the support area 5 below the region or regions 29 are connected to a second vacuum line system 26.

The vacuum can thus be turned on or off selectively for the regions 28, or the parts formed from the said regions by lateral separation and the surrounding substrate residues. It is thus possible, for example, for the worked parts to be selectively detached by switching off the vacuum in the line system 25, while the vacuum in the line system 26 is maintained and the substrate residues, or the regions 29, remain fixed on the vacuum plate 3.

FIG. 3 shows a subsequent method step with the apparatus 1 illustrated in FIG. 2. Here the parts 30 to be produced have been separated laterally from the substrate 20 by the lapping plungers. In this case, an interspace 31 running around the edge of the parts 30 between the parts 30 and the residues of the substrate 20, or the regions 29, has been produced by material removal.

Both the laterally separated parts 30 and the residual material of the substrate 20 are fixed on the substrate by suction by means of the channels 7 and 11, respectively. Afterward, the separated parts 30 are then detached from the first vacuum plate 3. In this embodiment of the invention, the parts 30 are detached from the vacuum plate 3 by lifting off the parts 30 from the first vacuum plate 3 by means of a second vacuum plate 33. In this case, the worked parts 30 are detached in groups, in particular even altogether.

Said second vacuum plate 33 likewise has channels 35 which are connected to a vacuum line system 39 and by means of which the parts 30 are subjected to suction. In order to achieve this the second vacuum plate 33 is constructed complementarily with respect to the first vacuum plate 3 with regard to the arrangement of the channels.

In order to prevent the separated parts 30 from being scratched, the second vacuum plate 33 may also be provided with elastic rings 37 and/or a plastic coating, in particular a Teflon coating. In order to detach the parts 30, the suction pressure below the parts 30 is turned off or reduced by means of the vacuum line system 25, for example by ventilating the lines. Through the channels 35 of the second vacuum plate 33, the parts 30 are then sucked on said plate 33 and can be lifted off. What is achieved by virtue of a corresponding arrangement of the channels 37, in particular corresponding to the channels 7 of the first vacuum plate, is that only the separated parts 30 but not surrounding regions 29 of the residual substrate are subjected to suction. In order to prevent residual parts of the substrate 20 from being lifted off, the vacuum in the line system 26 may additionally be maintained, so that said regions 29 remain sucked on the first vacuum plate 3.

FIG. 4 illustrates a further processing step. The separated parts 30 are sucked on the second vacuum plate 33 and transported to a washing magazine 40 with receptacles 41. By reducing or turning off, or interrupting the suction pressure by means of the vacuum line system 39, the parts 30 are then jointly or simultaneously detached from the second vacuum plate 33 and deposited into the receptacles 41 of the washing magazine 40.

FIG. 5 shows a further exemplary embodiment of a first vacuum plate 3. In contrast to the example illustrated in FIG. 1, the vacuum plate 3 shown in FIG. 5 has elevated regions 44 and recessed regions 46. In this case, the elevated regions 44 extend along the parts to be worked and the recessed regions extend along the substrate material surrounding said parts. The circular elevations 44, into which open the channels 7 for suction of the parts to be separated, accordingly correspond in terms of their lateral dimension and contour to the parts to be produced. The vacuum plate 3, as is illustrated in FIG. 5, accordingly serves for producing round parts from a plate-type substrate. In this case, too, the substrate is centered in a recess defined by the peripheral frame 13.

FIG. 6 shows a cross section through an exemplary embodiment of an apparatus 1 according to the invention for producing a plurality of parts 30 from a plate-type substrate 20 with such a vacuum plate 3. In this case, the substrate 20 to be processed initially bears on the elevated regions 44 of the vacuum plate and is subjected to suction by the vacuum of the channels 7. The lateral separation of the parts 30 from the substrate 20 is likewise effected by ultrasonic vibratory lapping by means of an ultrasonic grinding device 14 having a sonotrode 15 and grinding tools 17 fitted thereto. As in the example shown in FIG. 2, the pattern of the relative position of the parts with respect to one another corresponds to the arrangement of the shaping tools, or the grinding tools 17 on the sonotrode 15.

FIG. 7 shows the apparatus after the lateral separation of parts 30. In this case, the substrate parts surrounding the worked parts 30 have been sucked into the recessed regions 46 of the vacuum plate 3 by means of the vacuum channels 11 of the first vacuum plate 3. The parts 30 separated laterally by the removal of the substrate material in the region of the circular grinding face of the grinding tools 17 also remain under suction until detachment, in particular for depositing into a washing magazine.

In this case, in the corresponding manner to that illustrated in FIGS. 3 and 4, the detachment and depositing of the parts 30 may be effected by means of a complementary second vacuum plate 33. Since the regions 44 on which the parts 30 are sucked on the first vacuum plate 3 are elevated, it is also possible to deposit the parts directly from the first vacuum plate 3 into a washing magazine. For this purpose, the vacuum plate 3 is arranged with the support area 5 hanging downward and the vacuum in the vacuum line system is reduced, so that the parts 30 fall into the receptacles of a washing magazine. It goes without saying that the parts 30 can also already be worked in such an arrangement with a substrate fixed in a suspended fashion. This is likewise also possible with all the other embodiments of the invention.

FIG. 8 shows a further exemplary embodiment of a first vacuum plate with elevated and recessed regions. In this example, the vacuum plate 3 has recessed regions 44 surrounded by an elevated region 46, the recessed regions 44 being assigned to the parts to be worked from a substrate and corresponding to said parts in terms of form and dimensioning. Accordingly, here the substrate is fixed on a first vacuum plate 3 having elevated and recessed regions 44 and 46, the recessed regions 46 extending along the parts 30 to be worked and the elevated regions extending along the substrate material 29 surrounding said parts 30. The channels 7 for sucking the parts into the recessed regions 44 in this case open into the recessed regions 46. In contrast to the previous examples, however, there are no channels 11 present for sucking the surrounding substrate material.

FIG. 9 illustrates a cross section through an apparatus 1 according to the invention with a vacuum plate 3 structured in this way. In this example, the substrate 20 is fixed not by suction but rather by an adhesion agent 60 applied on the elevated region. The adhesion agent may comprise for example a double-sided adhesive tape or cement.

In this exemplary embodiment, the lateral separation of the parts, or the working from the substrate 20, is additionally effected by powder jet treatment. For this purpose, a powder jet device 54 having a plurality of powder jet nozzles 56 is arranged in a position opposite the substrate. In order to achieve a targeted processing with the powder jets emerging from the nozzles 56 and to remove substrate material only along the envisaged, in particular peripheral separating lines, the substrate 20 is covered with a mask 48, which leaves open regions 50 of the substrate 20 that run along the envisaged separating lines and covers regions 49 of the parts 30 to be worked. The mask 48 may be a photomasking, for example. The mask may likewise also be printed on, for example. During the powder jet process, the substrate material is removed at the non-masked regions 50.

In this exemplary embodiment, too, the parts 30 to be worked are sucked on the first vacuum plate 3, but not for the fixing of the substrate. Rather, in this case the parts 30 are firstly separated laterally, and are then sucked in the recessed regions through the channels 7. In particular, the worked parts 30, after lateral separation, are sucked into the recessed regions 44 of the first vacuum plate 3 and then fixed therein. This state is illustrated in FIG. 10. Although an adhesion agent 60 is indeed used here, contact between the parts 30 and the adhesion agent is nevertheless avoided since the adhesion agent comes into contact only with the surrounding substrate regions 29. In order to avoid damage to the parts as they are sucked into the recessed regions 46, the recesses may also again be provided with a plastic material, such as Teflon or a suitable elastomer.

In this exemplary embodiment, too, a second vacuum plate 22 constructed complementarily with respect to the first vacuum plate 3 is provided as a device for detaching the separated parts 30 from the first vacuum plate 3. In the example shown in FIG. 10, said second vacuum plate has not only a complementary arrangement of channels 35 but also complementary elevated and recessed regions 62 and 63, the elevated regions 62 being able to engage into the recessed regions 46 of the first vacuum plate 3 for the purpose of lifting off the parts 30. By applying a suction pressure to the vacuum line system 39 of the second vacuum plate 33 and reducing or interrupting the suction pressure at the vacuum line system 25 of the first vacuum plate 3, the parts 30 are then fixedly sucked and fixed at the second vacuum plate 33 and can then be lifted off by means of a second vacuum plate 33. Afterward, the parts 30 are then deposited in a washing magazine 40 in the manner illustrated in FIG. 4.

FIG. 11 shows an example of the use of the invention. FIG. 11 specifically illustrates a housed optoelectronic component 70. The optoelectronic component may be for example an optical sensor or a laser diode. The housing comprises an optocap 72, for example made of sheet metal, high-grade steel, an alloy, which is connected to a rim 73 on a base 74 with connecting legs 75. The optoelectronic component is situated on the base 73 in a manner enclosed in the optocap. A part 30 that can be produced according to the invention in the form of a glass disk closes off an opening in the optocap and serves as a window for the optoelectronic component. In order to produce the optocap 72 with the part 30, the part 30 may for example be soldered into the housing of the optocap using glass solder.

The parts 30 separated from the substrate 20 are used in the example shown in FIG. 11. In accordance with a further alternative or additional embodiment of the invention, however, it is also possible to use the substrate 20 as described above. Such an example is explained below with reference to FIGS. 12 and 13. Rectangular or square substrates 20 have been used in the examples explained previously. It goes without saying, however, that it is also possible to use other substrate forms, such as round, plate-type substrates, for instance. Thought is given here in particular to wafers, preferably glass wafers.

Generally, this embodiment of the invention provides for processing a wafer by separation of parts, in particular as described above, with the result that a wafer having a multiplicity of holes or passage openings is obtained, and for producing a wafer assembly with said wafer and a further wafer, in particular a functional wafer.

A wafer 200 as substrate 20 after processing is shown in plan view in FIG. 12. The wafer 200 correspondingly has a plurality of holes or passage openings 21 after the separation of the parts 30. The wafer 200 itself is then processed further, an assembly with a functional wafer being produced. FIG. 13 shows such an assembly 79. The wafer 200 having the multiplicity of passage openings 21 is bonded onto a functional wafer 80. In this case, a functional wafer is generally understood to be a wafer having functional regions with electronic and/or optoelectronic and/or microelectronic mechanical components. In the example shown in FIG. 13, the wafer 200 is bonded onto the functional side of the functional wafer 80 such that the functional regions 81 are in each case arranged in the holes 21, or are in each case surrounded by the edge of a passage opening 21. A further wafer 83 as covering wafer is bonded onto the wafer 200, so that with the passage openings 21 cavities 85 are formed which enclose the functional regions. A hermetic encapsulation of the functional regions is preferably achieved. If the functional regions comprise optoelectronic components, then a transparent covering wafer 83 is preferably used. By way of example, it is then also possible for further optical elements to be placed onto said covering wafer 83, or the covering wafer 83 may itself have integrated optical elements, such as in particular lenses. In this case, the wafer 200 processed according to the invention may serve particularly advantageously as a precise spacer for the optical elements. In order to obtain individual chips from the wafer assembly 79, the individual components can then be separated from the wafer assembly 79 on the basis of envisaged separating lines depicted in dashed hyphen.

It is clear to the person skilled in the art that the invention is not restricted to the exemplary embodiments described above, but rather can be varied in diverse ways. In particular, the features of the individual exemplary embodiments may also be combined with one another.

List of Reference Symbols
1 Apparatus for producing a plurality of parts from a plate-type substrate
3 First vacuum plate
5 Support area for substrate
7 First channels for fixing parts to be worked
9, 37 Elastic ring
11 Second channels for fixing residual material of a substrate
12 Exchangeable support of 3
13 Frame
14 Ultrasonic grinding device
15 Sonotrode
17 Lapping plunger
20 Plate-type substrate
21 Passage openings in 20
25, 26, 39 Vacuum line systems
28, 29 Regions of the substrate 20
30 Part separated from 20
31 Interspace
33 Second vacuum plate
35 Channels in 33
40 Washing magazine
41 Receptacle of 40 for part 30
44 Elevated regions of 5
46 Recessed regions of 5
48 Mask
49 Regions covered by 48
50 Gaps in 48, regions left open by 48
54 Powder jet device
56 Powder jet nozzles of 54
60 Adhesion agent
62 Elevated region of 33
63 Recessed region of 33
70 Optoelectronic component
72 Optocap of 70
73 Rim of 72
74 Base of 70
75 Connecting legs
79 Wafer assembly
80 Functional wafer
81 Functional regions of 80
83 Covering wafer
85 Cavity
200 Wafer

What is claimed is:

1. A method for separating a plurality of parts (30) from a plate-type substrate (20), the method comprising:
   laterally separating the parts (30) from the plate-type substrate (20) fixed on a first vacuum plate (3) having elevated and recessed regions (44, 46), wherein the plate-type substrate (20) is centered in a recess in the first vacuum plate (3);
   sucking the parts (30) on the first vacuum plate (3) into the recessed regions after the separating; and
   detaching the separated parts (30) from the first vacuum plate (3).

2. The method as claimed in claim 1, further comprising:
   sucking the plate-type substrate (20) on the first vacuum plate (3), and
   wherein the parts (30) remain sucked on the first vacuum plate (3) during the separating.

3. The method as claimed in claim 1, further comprising: fixing the plate-type substrate (20) on the first vacuum plate (3) prior to the separating.

4. The method as claimed in claim 1, wherein detaching the parts (30) from the vacuum plate (3) comprises lifting off the parts (30) from the first vacuum plate (3) by means of a second vacuum plate (33).

5. The method as claimed in claim 1, wherein detaching the parts (30) comprises one of (i) switching off and (ii) reducing the suction pressure of the first vacuum plate (3) at least below the laterally separated parts (30).

6. The method as claimed in claim 1, wherein the parts (30) are detached in groups or all together.

7. The method as claimed in claim 1, wherein the parts (30) are deposited in a washing magazine (40) after separation.

8. The method as claimed in claim 1, wherein the substrate (20) comprises at least one of (i) brittle material and (ii) hard material.

9. The method as claimed in claim 1, wherein glass parts are separated from a glass substrate (20).

10. The method as claimed in claim 1, wherein at least one of (i) round parts and (ii) oval parts (30) are worked from the substrate (20).

11. The method as claimed in claim 1, wherein the separation of the individual parts (30) is in each case carried out along a peripheral separating line.

12. The method as claimed in claim 1, wherein the parts (30) are laterally separated by ultrasonic grinding.

13. The method as claimed in claim 1, wherein the parts (30) are laterally separated by powder jet treatment.

14. The method as claimed in claim 1, wherein the substrate (20) is covered with a mask which leaves open regions of the substrate (20) that run along envisaged separating lines and covers regions of the parts (30) to be worked.

15. The method as claimed in claim 1, further comprising sucking the substrate (20) on the first vacuum plate (3).

16. The method as claimed in claim 15, wherein the substrate (20) is sucked on the first vacuum plate (3), wherein the elevated regions (44) extend along the parts (30) to be worked and the recessed regions (46) extend along substrate material (29) surrounding the parts (30).

17. The method as claimed in claim 16, wherein substrate material (29) surrounding the parts (30) are sucked into the recessed regions (46) of the first vacuum plate (3).

18. The method as claimed in, claim 1, wherein the recessed regions extend along the parts (30) to be worked and the elevated regions extend along substrate material (29) surrounding the parts (30).

19. The method as claimed in claim 18, wherein the plate-type substrate (20) is adhesively fixed on the elevated regions.

20. The method as claimed in claim 1, wherein the parts in the plurality of parts (30) are simultaneously worked from the substrate (20).

21. The method as claimed in claim 1, wherein first regions assigned to the parts (30) to be worked and second regions of the plate-type substrate (20) surrounding said parts (30) are sucked in selectively driven fashion.

22. The method as claimed in claim 1, wherein the plurality of parts are worked from a wafer.

23. A method for producing optocaps (72) comprising:
   producing window parts (30) in the optocaps (72) by means of a method that comprises:
   a) laterally separating the window parts (30) from a plate-type substrate (20) fixed on a first vacuum plate (3) having elevated and recessed regions (44, 46), wherein the plate-type substrate (20) is centered in a recess in the first vacuum plate (3);
   b) sucking the window parts (30) on the first vacuum plate (3) into the recessed regions after the separating; and
   c) detaching the separated window parts (30) from the first vacuum plate (3).

* * * * *